Dec. 10, 1940. W. K. BARNETT 2,224,284
METHOD OF PRESERVING FLOWERS AND APPARATUS THEREFOR
Filed Dec. 12, 1938 2 Sheets-Sheet 1

INVENTOR:
WILLIAM KING BARNETT
BY
ATTORNEY.

INVENTOR:
WILLIAM KING BARNETT
BY Harry A. Bennes
ATTORNEY.

Patented Dec. 10, 1940

2,224,284

UNITED STATES PATENT OFFICE 2,224,284

METHOD OF PRESERVING FLOWERS AND APPARATUS THEREFOR

William King Barnett, Webster Groves, Mo.

Application December 12, 1938, Serial No. 245,073

2 Claims. (Cl. 21—3)

My invention has relation to improvements in methods of and apparatus for preserving flowers, and consists of the novel features more fully set forth in the specification and pointed out in the claims.

The principal object of the invention is the preservation of flowers by a drying process in a manner that will enable them to retain their natural physical characteristics and shape. It is a further object of the invention to provide apparatus for practicing the process expeditiously and inexpensively so that the natural flowers may be used in place of artificial flowers for decoration, window displays, etc.

It is a matter of common knowledge that when flowers or plants dry they wither to a certain extent and the leaves and petals curl so that the flower loses its natural beauty and no longer serves any useful purpose. I have discovered that when a flower or plant is dehydrated rapidly under confinement (that is, under conditions in which the leaves, petals and other parts of the plant are held in their natural relative positions) it retains its natural beauty and gracefulness even though it be in a completely dried state. Of course, in some plants the leaves may fade somewhat and lose the luster of life but this may be corrected by spraying them with a solution containing a suitable quick drying green color.

Figure 1:
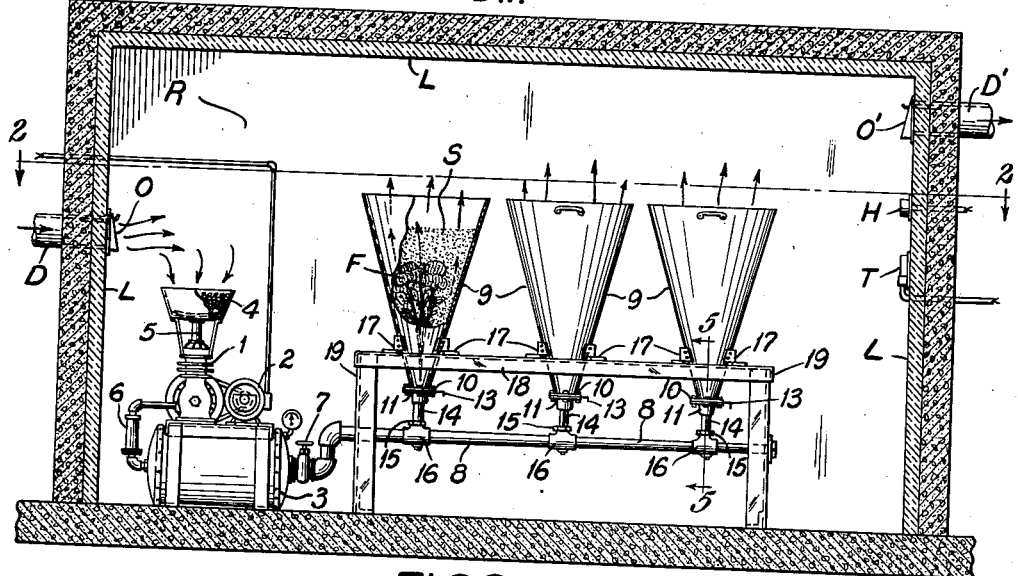
Figure 2:
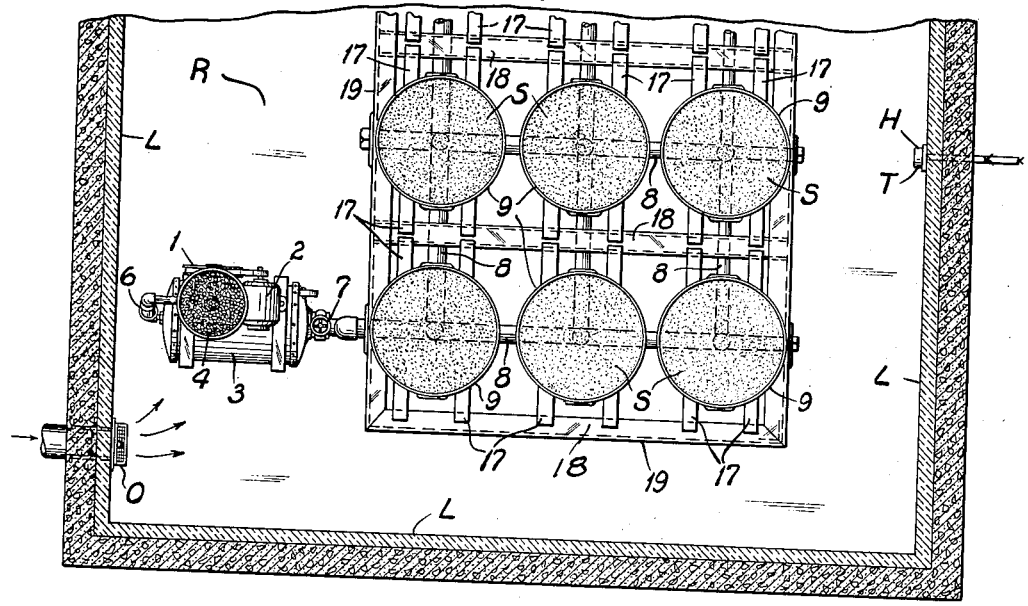
Figure 3:
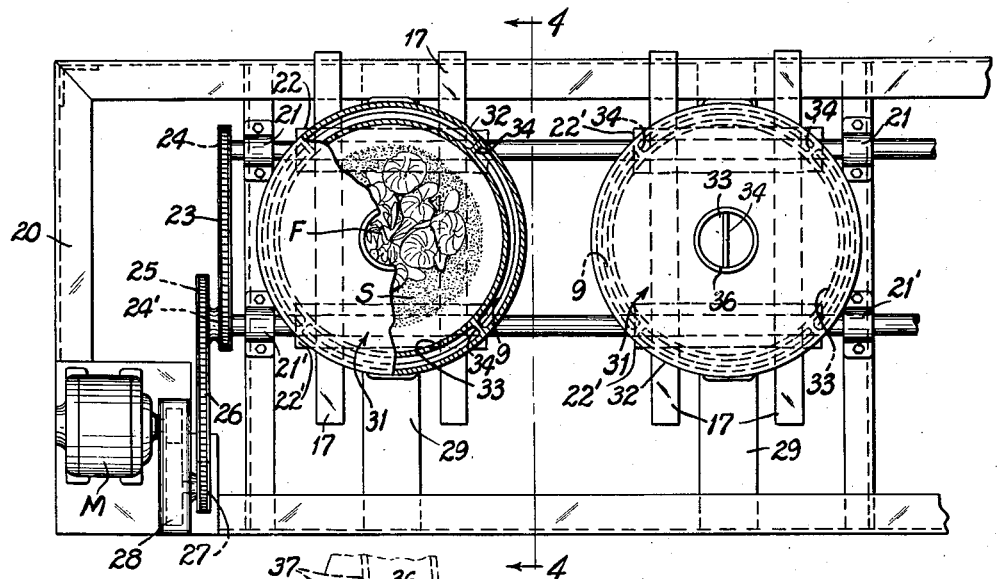
Figure 4:
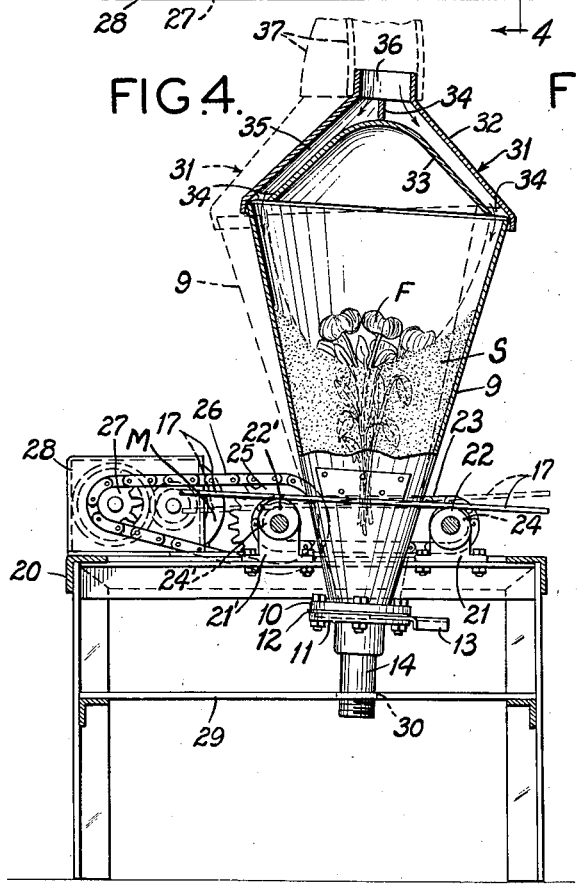
Figure 5:
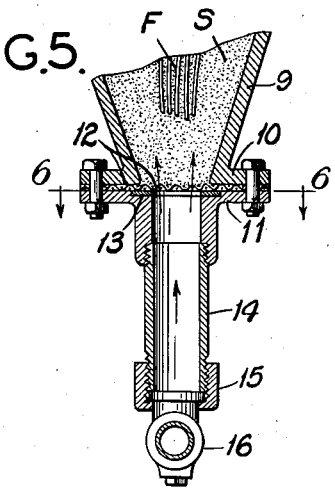
Figure 6:
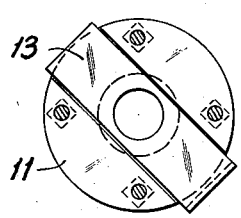

The process will be best understood by a detailed description of the apparatus employed in practicing the same, illustrated in the accompanying drawings, in which:

Figure 1 is a vertical cross-sectional view of a room in which my apparatus is shown in side elevation with parts broken away. Fig. 2 is a horizontal cross section taken on a plane indicated by the line 2—2 in Fig. 1, showing a part of the room and a part of the apparatus in top plan. Fig. 3 shows a top plan of the apparatus used in preparing the plant for the dehydrating operation. Fig 4 is a vertical cross section taken on the line 4—4 of Fig. 3 with parts of the apparatus shown in longitudinal section. Fig. 5 is a cross-sectional detail taken on the line 5—5 of Fig. 1. Fig. 6 is a cross-sectional detail taken on a plane indicated by the line 6—6 in Fig. 5.

Referring to the drawings and for the present to Figures 1 and 2, R represents a room which is made impervious to moisture by a suitable waterproof lining L and which has a damper controlled inlet opening O leading from a supply duct D. There is also an outlet opening O' from which leads a discharge duct D'. The room is provided with a thermostat T and a humidistat H for controlling both temperature and humidity of the air within the room. Such air conditioning devices are well known in the art and need no specific description herein. Suffice it to say that the purpose of the air entering through opening O and discharging through opening O' is to keep the temperature of the room approximately 100° F. and as close to 0% humidity as is possible.

Within the room is an air-compressing unit 10 comprising a compressor 1 driven by a motor 2 and a compressed air storage tank 3. A receptacle 4 for a suitable dehydrating substance such as calcium chloride is disposed in proximity to the compressor and is connected to the air intake thereof by a suitable pipe 5. As a matter of precaution a second dehydrator 6 may be connected between the exhaust side of the compressor and the tank 3. A control valve 7 is connected at one end of the tank 3, and a compressed air distributing pipe 8 leads from the control valve 7 to a battery of containers 9, 9 in which the flowers or plants are arranged for dehydration.

The flowers F are restrained from curling and withering during the drying process by fine sand S charged into the containers 9 in a manner more fully hereinafter to be explained. The lower end of each container 9 is provided with a flange 10, between which and a second flanged fitting 11 is a screen 12 of a sufficiently fine mesh to prevent the discharge of the sand from the container during the dehydrating operation. A slide valve 13 is provided in the fitting 11 (as shown in Figures 5 and 6) so that the bottom of the container may be closed off during the time the sand is being charged therein.

The container 9 is connected to the compressed air distributing pipe 8 by means of a nipple 14 and coupling 15, together with a T 16, one of which is provided for each container 9 in the line. Each of the containers 9 has a pair of oppositely disposed supporting brackets 17, 17 which rest on suitable cross members 18, 18 of a supporting frame 19.

The parts thus far described comprise the apparatus used in connection with the actual dehydration of the flowers. However there is additional apparatus illustrated in Figures 3 and 4 which is used in connection with the operation of charging the containers 9. This apparatus comprises a suitable supporting frame 20 supporting suitable bearings 21, 21', in which are mounted rollers 22, 22' simultaneously actuated through a sprocket chain 23 operating over the sprockets 24, 24' at adjacent ends of the rollers 22, 22'.

Roller 22' is provided with a sprocket 25 driven through a chain 26 from sprocket 27 connected to motor M through suitable gearing housed within the gear box 28.

The supporting frame 20 is provided with a plate 29 a short distance below the eccentrically mounted rollers 22, 22', which plate is provided with suitable perforations 30 to receive the nipple 14 when container 9 is supported through its brackets 17, 17 on the rollers 22, 22'. The purpose of the eccentrically mounted rollers 22, 22' is to gently agitate the containers 9 as they are charged with the fine sand S through the feed cover 31. This feed cover is in the shape of an inverted funnel and has an outer shell 32 and inner shell 33 spaced therefrom by means of four spacing ribs 34. The spaced shells 32 and 33 provide an annular space 35 through which the sand flows from the funnel neck 36 and effects a peripheral discharge into the container 9. As the sand flows into the container 9 from a suitable hopper (not shown) the container is gently agitated by the action of the rollers 22, 22' driven by the motor M, and the sand particles sift in around the flower F without disturbing the leaves or petals thereof, until finally when the container is full of sand the flower is firmly held in its original natural shape. The funnel neck 36 is connected by a suitable flexible hose 37 to the sand supply hopper (not shown).

During the time that the container 9 is being charged with sand, as just described, the slide valve 13 is moved to its closed position so as not to permit the discharge of sand from the bottom of container 9. However, after the container is charged and connected to the compressed air distributing pipe 8, as heretofore explained, the valve 13 is moved to its opened position and the compressed air supply valve 7 is also opened to permit the compressed air to enter each of the containers 9 and move upwardly through the containers to carry the moisture from the flowers. Of course, as the moist air discharged from the containers enters the room R, it will be exhausted through the outlet opening O'. Thus the continuous passage of warm dry air over the flowers within the containers will in a comparatively short time effect a complete dehydration of the flowers, while the sand in which the flowers are packed will hold them in their natural state until the dehydration process is completed. The sand is then gently removed from the containers and the flowers are retained in a natural dry state. If, as stated above, the plant is of such a nature that the leaves lose their color or luster, they may be touched up by spraying them with the desired color to restore their lifelike appearance.

Having described my invention, I claim:

1. The method of preserving flowers which comprises confining the flowers in an air pervious dry fluent medium within a suitable enclosure, causing dry air from the enclosure to traverse the medium to effect a dehydration of the flowers, and maintaining a low humidity atmosphere within the enclosure.

2. In combination with a suitable enclosure, apparatus within said enclosure for drying flowers comprising a container in which the flowers are held under confinement by an air pervious medium, means for causing air from the enclosure to traverse said medium, means for previously dehydrating said air, and means for exhausting from said enclosure the air discharged from the container.

WILLIAM KING BARNETT.